United States Patent [19]

Hamilton et al.

[11] Patent Number: 5,542,704
[45] Date of Patent: Aug. 6, 1996

[54] AUTOMOTIVE INFLATABLE SAFETY SYSTEM PROPELLANT WITH COMPLEXING AGENT

[75] Inventors: Brian Hamilton, Littleton, Colo.; Robert Renz, Mesa, Ariz.

[73] Assignee: Oea, Inc., Aurora, Colo.

[21] Appl. No.: 309,027

[22] Filed: Sep. 20, 1994

[51] Int. Cl.⁶ .................................................. B60R 21/28
[52] U.S. Cl. ............................. 280/741; 280/736; 149/36
[58] Field of Search ..................................... 280/736, 741, 280/728.1; 149/36; 102/530, 531; 222/3

[56] References Cited

U.S. PATENT DOCUMENTS

| | | | |
|---|---|---|---|
| 3,250,651 | 5/1966 | Bell et al. | 149/19 |
| 3,523,047 | 8/1970 | Bridgforth et al. | 149/36 |
| 3,653,993 | 4/1972 | Batchelder et al. | 149/19 |
| 3,665,708 | 5/1972 | Duncan et al. | 149/36 |
| 3,732,694 | 5/1973 | Blumenthal et al. | 60/218 |
| 3,811,970 | 5/1974 | Henderson et al. | 149/36 |
| 3,909,322 | 9/1975 | Chang et al. | 149/36 X |
| 3,933,543 | 1/1976 | Madden | 149/21 |
| 3,944,448 | 3/1976 | Marlowe et al. | 149/22 |
| 4,468,263 | 8/1984 | Artz et al. | 149/36 X |
| 4,834,817 | 5/1989 | Zeuner et al. | 280/741 |
| 5,197,758 | 3/1993 | Lund et al. | 280/741 |
| 5,386,775 | 2/1995 | Poole et al. | 149/36 X |
| 5,439,251 | 8/1995 | Onishi et al. | 280/741 |

*Primary Examiner*—Christopher P. Ellis
*Attorney, Agent, or Firm*—Sheridan Ross & McIntosh

[57] ABSTRACT

The present invention relates to solid pyrotechnic propellant compositions useful in automotive inflatable safety systems for generating gas to inflate air/safety bags. The propellant compositions produce surprisingly high gas volume to weight ratios when combusted and substantially little to no production of smoke, particulate matter and toxic gases. These propellant compositions include a complex or coordination compound, preferably, a complex of hydrazine.

31 Claims, 1 Drawing Sheet

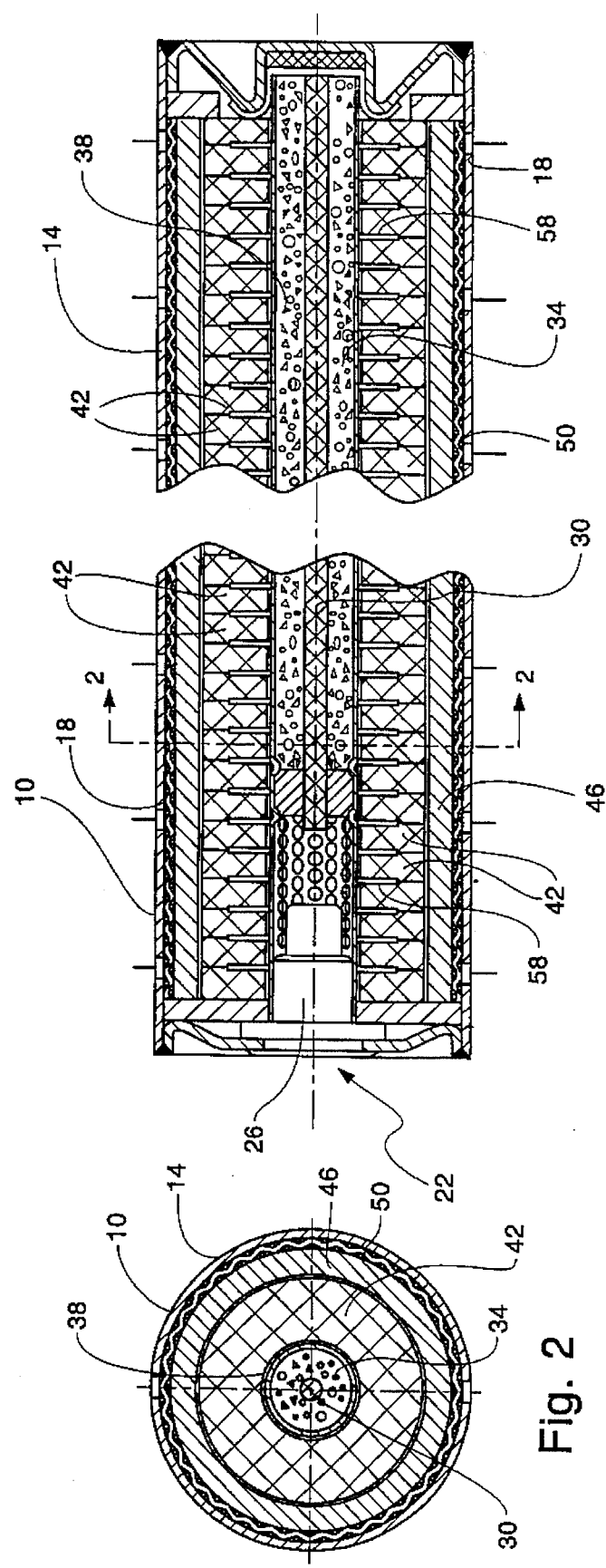

AUTOMOTIVE INFLATABLE SAFETY SYSTEM PROPELLANT WITH COMPLEXING AGENT

FIELD OF THE INVENTION

The present invention relates generally to automotive inflatable safety systems. In particular, the present invention relates to propellants used in such systems which include a complexing agent, preferably a hydrazine complexing agent.

BACKGROUND OF THE INVENTION

Today, automotive inflatable safety systems are becoming commonplace for reducing the incidence of serious injuries to automobile occupants in automobile accidents. These automotive inflatable safety systems generally comprise an appropriate detector, an inflator assembly and an air/safety bag. When triggered by the detector, such as the result of an automobile collision, the inflator assembly provides gases to inflate the air/safety bag to protect the occupants of the automobile from interior components of the automobile.

A considerable amount of effort has been expended in designing inflator assemblies, or simply "inflators" for use in automotive inflatable safety systems. Inflators have been designed which use stored gases, gas generating propellants and a combination of stored gases and gas generating propellants for inflating the air/safety bag. Inflators using pyrotechnic propellants allow for the use of inflators that are compact in size and weigh less than other types of inflators, such as stored gas inflators which contain heavy and bulky gas storage tanks. Due to weight and space constraints imposed by the automobile structure, most modern automotive inflatable safety systems utilize a pyrotechnic gas generating propellant for inflating the air/safety bag. Inflators utilizing only gas generating, pyrotechnic propellants ("pure pyrotechnic inflators") and inflators which utilize both stored gases and gas generating, pyrotechnic propellants ("hybrid inflators") are at present, commonly in use.

Known pyrotechnic propellants used in automotive inflatable safety systems, such as those based upon azides, nitrotriazoles and tetrazoles, have several drawbacks. In some instances, the propellant compositions can produce combustion gases, such as carbon monoxide, which can be dangerous to the occupants of an automobile if present in large quantities. Most known pyrotechnic propellants used in inflators produce hot gases and airborne liquid or solid particulate matter which, unless filtered from the produced gas, could destroy or puncture the air/safety bag, potentially harming occupants of the automobile. The addition of complex mechanisms for filtering the generated gases undesirably increases the intricacy of the inflator design and leads to increased production costs. In addition, most pyrotechnic propellants currently used in inflators produce smoke, which, even if physically harmless, may have negative psychological effects upon automobile occupants who have experienced an accident.

Based on the foregoing, it is evident that in general, it is both useful and desirable to provide pyrotechnic propellants which would allow use of inflator assemblies having reduced weight and size than inflators commonly in use. It would be further desirable to provide pyrotechnic propellants which generate substantially little to no airborne particulate matter upon combustion, thereby reducing filtering requirements for the produced gases and allowing for the use of inflators having simplified designs. Moreover, it would be desirable to provide pyrotechnic propellants for use in an automotive inflatable safety system which produce substantially little to no smoke or toxic gases.

SUMMARY OF THE INVENTION

The present invention is directed toward propellants and propellant compositions for an automotive inflatable safety system which include a complexing agent, preferably hydrazine, and which exhibits certain desired properties. Generally, these propellant compositions exhibit desired ballistic properties, e.g., enhanced burn rate, large gas generation capabilities and residue retention characteristics. With regard to residue retention, the propellant compositions of the present invention reduce the amount of particulate matter which should be filtered from the produced gases prior to being provided to the air/safety bag. In one aspect of the present invention, compositions are provided which are suitable for use as gas generating pyrotechnic propellant compositions in inflator assemblies of automotive inflatable safety systems. These propellant compositions comprise a physical mixture of a complex or "coordination" compound, an oxidizing compound and a slag forming compound. In a preferred embodiment, the complex compound can be a complex of hydrazine. The complex of hydrazine can be a metal complex of hydrazine of the general formula:

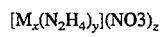

$$[M_x(N_2H_4)_y](NO3)_z$$

Where:
M=at least one metal;
x∈{1,2,3, . . . };
y∈{1,2,3, . . . }; and
z∈{1,2,3, . . . }.

Moreover, the complex of hydrazine can be a transition metal complex of hydrazine, and in a preferred embodiment, is zinc nitrate hydrazine. Although described and shown herein in anhydrous form, all references herein to zinc nitrate hydrazine or the general formula appearing above should be understood to include any of their hydrated forms, such as, the monohydrate of zinc nitrate hydrazine $[Zn(N_2H_4)_3](NO_3)_2 \cdot H_2O$, etc. The oxidizing compound can be an inorganic oxidizer such as one or more alkaline earth metal nitrates, alkaline earth metal nitrites, alkali metal nitrates, alkali metal nitrites, and transition metal oxides.

The slag forming compound makes the propellants of the present invention particularly useful for the noted automotive inflatable safety system applications in that it contributes to reduce the filtering requirements of the system. Specifically, the slag forming compound facilitates the creation of a solid or solid-like, amorphous or oriented residue which is more easily filtered and/or which does not require filtering. In this regard, the noted slag forming compounds can also include fibers which further assist in residue retention and/or can in fact function as a slag forming compound.

In another aspect of the present invention, a hydrazine-containing propellant is contained within a gas generator housing having at least one gas outlet. A propellant ignition assembly is also provided such that the propellant may be ignited when an appropriate signal is provided to the propellant ignition assembly, such as from a deceleration detector. The hydrazine-containing propellant can be in accordance with the above-noted compositions.

Another aspect of the present invention relates to an inflator assembly for an automotive inflatable safety system which includes a gas generator housing having at least one gas outlet. A pyrotechnic propellant composition having a burn rate of at least about 1 inch/second (2.54 cm/sec) at 1,000 psi (6.9 MPa) and capable of producing at least about 2 gram moles of gas from about 100 grams of the propellant composition is disposed inside the gas generator housing. When ignited by an ignition assembly, the propellant composition therefore a desired amount of gas at a desired burn rate. Such propellant compositions can include those comprising a compound containing hydrazine.

BRIEF DESCRIPTION OF THE DRAWINGS

FIG. 1 is a longitudinal cross-sectional view of a gas generator for an automotive inflatable safety system; and FIG. 2 is a cross-sectional view of the gas generator of FIG. 1 along line 2—2.

DETAILED DESCRIPTION OF THE PREFERRED EMBODIMENT

Generally, the present invention relates to propellants and to novel solid propellant compositions useful in automotive inflatable safety systems for generating gas to inflate air/safety bags. Such propellants and propellant compositions can be used in both pure pyrotechnic and hybrid inflators for automotive inflatable safety systems, and address the shortcomings associated with the use of known propellants. In particular, the propellants and propellant compositions of the present invention produce surprisingly high gas volume to weight ratios when combusted. Furthermore, as taught in more detail below, the propellants and propellant compositions of the present invention can be combusted with substantially little to no production of smoke, particulate matter and toxic gases.

As used herein, the phrase "propellant composition" refers to a physical mixture incorporating one or more propellants of the present invention and one or more additives. As used herein, the term "propellant" refers to the propellant compounds specifically described below.

In one embodiment, the propellant compositions of the present invention comprise physical mixtures containing one or more complex or "coordination" compounds containing a complexing agent, preferably a hydrazine complexing agent. The propellants utilized in the present invention can be combined with various other compounds to modify the burn characteristics and other physical properties of the resultant propellant composition. For example, the propellant compositions can include, without limitation, oxidizers, slag forming compounds, pressing aids, binders, gelling agents and sensitizers. Upon processing, the propellant compositions of the present invention can be formed into solid grains or wafers for use in an inflator assembly of an automotive inflatable safety system. The present invention will hereinafter be described in relation to the preferred hydrazine complexing agent.

It has been determined that hydrazine-containing compounds are particularly useful as propellants for automotive inflatable safety systems in accordance with principles of the present invention. Such compounds can, in general, be easily and inexpensively obtained and combined with other materials. The propellants of the present invention generally exhibit burn rates in excess of about 1 inch/second (2.54 cm/sec) at 1000 psi (6.9 MPa), and more typically, in excess of about 1.3 inches/second (3.3 cm/sec) at 1,000 psi (6.9 MPa). Such burn rates are desirable for achieving gas production for inflating an air/safety bag in sufficient time to protect automobile occupants in an accident. Also, as a result of the high burn rates, the propellant compositions of the present invention need not be formed into complex grain structures to enhance burn rates, thereby reducing production costs for the inflator. Upon combustion, the propellants of the present invention produce mainly water vapor and nitrogen ($N_2$) gas, and substantially little to no smoke. The hydrazine propellants exhibit long-term stability at 225° F. (107° C.), and typically achieve combustion temperatures less than about 3000° F. (1649° C.), which are within acceptable limits.

The propellants preferred for use in the present invention comprise complex compounds including the complexing agent hydrazine ($N_2H_4$), and even more preferably comprise metal complexes of hydrazine of the general formula:

Where:
M=at least one metal;
$x \in \{1,2,3, \ldots \}$;
$y \in \{1,2,3, \ldots \}$; and
$z \in \{1,2,3, \ldots \}$.

Although numerous metals can be used successfully in the propellants of the present invention, it is desirable that the metal be nontoxic, particularly if the propellant or the residue is to come in contact with humans. Metals suitable for use in the present invention include those selected from the group consisting of transition metals. Preferably, however, metals suitable for use in the present invention include those selected from the group consisting of zinc, nickel, copper, chrome, manganese, magnesium, cobalt and calcium. More preferably, a metal suitable for use in the present invention comprises zinc. Although described and shown herein in anhydrous form, all references herein to zinc nitrate hydrazine or the general formula appearing above should be understood to include any of their hydrated forms, such as, the monohydrate of zinc nitrate hydrazine $[Zn(N_2H_4)_3](NO_3)_2 \cdot H_2O$, etc.

Although the hydrazine-containing propellants of the present invention can be used by themselves to generate gas, it is generally desirable to incorporate the propellants into a physical mixture with additional compounds when preparing the propellants for use in an automotive inflatable safety system. In general, it has been found desirable to mix an oxidizer with the hydrazine-containing propellants of the present invention to urge the combustion reaction to completion and to minimize the formation of undesirable combustion by-products such as ammonia. Although numerous types of oxidizers can be used successfully in the present invention, generally the desirable oxidizers for inflatable safety systems applications are those which will not create toxic gases or substantial amounts of smoke upon degradation through combustion or combination with the propellant or other propellant composition constituents. Suitable oxidizers include inorganic oxidizers, such as those selected from the group consisting of alkali or alkaline earth metal nitrates or nitrites, including, but not limited to, sodium nitrate, potassium nitrate and strontium nitrate. Still other inorganic oxidizers include those selected from the group consisting of transition metal oxides, including, but not limited to, iron oxide, copper oxide, and manganese dioxide.

For most automotive inflatable safety system applications, it further desirable to add a slag forming compound to the propellant composition. The phrase "slag forming compound" as used herein, refers to compositions which, as a result of the heat released during combustion of the hydrazine propellant create a solid or solid-like, glassy, amorphous or oriented residue. It is generally believed that formation of a viscous residue in the propellant compositions reduces the amount of particulate matter which evolves from the propellant composition upon combustion and production of gas. In some instances, the formation of the slag can reduce the heat given off by the propellant composition during combustion by absorbing heat released in the exothermic combustion reaction. Alternatively, the propellant compositions can include fibers which act in a similar fashion, to trap particulate matter during combustion and/or to reduce the heat given off by the propellant composition during combustion. Some types of fibers can also act as slag forming compounds.

The term, "particle retention" as used herein, refers to the ability of a propellant composition to retain particulate matter during combustion. Particle retention can be measured by comparison of actual residue weight (after combustion) to the calculated theoretical residue weight of the propellant composition (after evolution of the gases produced during combustion). Such measurements, for comparison purposes are stated as a percentage of theoretical residue weight. Typically, it is advantageous, and possible to obtain through the use of the propellant compositions of the present invention, particle retention values within a range of from about 85% to about 100%. Preferably, by practicing the present invention, it is possible to obtain particle retention values in excess of about 95%, and more preferably, particle retention values in excess of about 98%.

Numerous compounds are capable of performing the function of a slag forming compound and can be used successfully in the present invention. It is generally desirable that the slag forming compounds used be non-toxic, non-corrosive, and not form toxic gases either alone or in combination with the other propellant composition constituents during combustion. Slag forming compounds should be selected to maximize retention of particulate matter created during combustion, thereby reducing the amount of particulate matter borne by the gases created. Such compounds should be viscous in their liquid state and cool to solids quickly. Slag forming compounds useful in the present invention can include compounds and mixtures of compounds which form glasses and/or ceramics upon combustion of the propellant mixture. Particularly useful are those materials selected from the groups consisting of aluminates and silicates. Slag forming compounds preferred for use in the present invention include, but are not limited to, silicon dioxide, aluminum dioxide, aluminum silicate and mixtures thereof. Further slag forming compounds preferred for use in the present invention include, but are not limited to, anhydrous alumina ($Al_2O_3$), $Al_2O_3.H_2O$, $Al_2O_3.3H_2O$ and $Mg(OH)_2$, which exhibit the combined advantages of cooling the combustion reaction, forming a more manageable residue and producing additional gas in the form of water vapor.

Similar to slag forming compounds, numerous types of fibers can be used successfully in the propellant compositions, and such fibers should be non-toxic, non-corrosive, and not form toxic gases either alone or in combination with the other propellant composition constituents during combustion. Fibers which can be suitable for use in the propellant compositions of the present invention include, but are not limited to those made of graphite or glass. Glass fibers are particularly useful, because they both contribute favorably to the rheological properties of the propellant composition during processing, and act as satisfactory slag forming compounds when subjected to the combustion temperatures of the propellants. Preferably, such fibers include glass fibers, such as Schuller 753 glass, "E" glass (both available from Manville Corporation), or "S" glass fibers available from Owens-Corning. One can also use silicate particles such as CAB—O—SIL (colloidal silica) available from Cabot, Inc., and SUPERFLOSS, available from Manville Corporation.

While not necessary for use of the propellants of the present invention, when used in automotive inflatable safety systems, it can be advantageous to include additional additives, coatings, sensitizers, noxious gas controllers and processing aids to the propellant compositions. The selection of such additives typically depends upon the desired characteristics or rheological properties of the propellant composition. For example, small amounts of water, talc or hydroxypropyl cellulose, (e.g., less than about 5 wt % of the propellant composition) can be added to the propellant for use as a processing aid in pressing and obtaining propellant grains. Sodium azide ($NaN_3$), urea, or ammonia forming compounds can be added to the propellant composition to promote the formation of trace amounts of ammonia to suppress the formation of nitric oxides ($NO_x$). Sodium azide can also be used to generate additional amounts of nitrogen gas to provide an optimal exhaust gas composition. Coatings can also be applied to the propellant grains to control burn rates and/or degradation properties, and sensitizers can be added to lower the ignition temperature or ignition impact force of the propellants.

In general, a hydrazine-based propellant composition in accordance with principles of the present invention comprises at least about 40% by weight of a metal complex of hydrazine. Preferably, from about 50% by weight to about 70% by weight of the propellant composition comprises at least one metal complex of hydrazine and, more preferably, from about 65% by weight to about 70% by weight of the propellant composition comprises a metal complex of hydrazine. The remainder of the propellant composition can also comprise, among other things, slag forming compounds, oxidizers, other additives and incidental impurities.

Typically, however, when adapting the propellants of the present invention for automotive safety system applications, from about 5% by weight to about 25% by weight of the propellant composition will comprise an inorganic oxidizer, and preferably, from about 8% by weight to about 15% by weight of the propellant composition will comprise an inorganic oxidizer. In addition, in most instances, from about 5% by weight to about 25% by weight of the propellant composition will comprise a slag forming compound, preferably from about 10% by weight to about 18% by weight of the propellant will comprise a slag forming compound. Other additives and incidental impurities can be found in the propellant compositions of the present invention in amounts of from about 2% by weight to about 20% by weight, and more typically in amounts less than about 15% by weight of the propellant composition.

Alternatively, or in addition to a slag forming compound, the propellant compositions of the present invention can include from about 5% by weight to about 20% by weight fiber material, preferably from about 8% by weight to about 15% by weight fiber material and more preferably, from about 8% by weight to about 10% by weight fiber material.

It has been determined that zinc nitrate hydrazine can be particularly useful as a pyrotechnic propellant composition for use in automotive inflatable safety systems. Zinc nitrate hydrazine (ZNH), having a general formula $[Zn(N_2H_4)_3](NO_3)_2$, is particularly advantageous as a propellant because it is relatively nontoxic, inexpensive and easy to produce, and it can be made by simply mixing zinc nitrate (or its hydrate) with hydrazine (or its hydrate). When combusted by itself, ZNH tends to be fuel rich, thus, for efficient use of ZNH as a propellant in an automobile safety system, it is generally desirable to combine ZNH with an oxidizer to obtain complete combustion and to suppress the formation of ammonia. Upon combustion, the ZNH propellant typically produces a gas containing from about 30% to about 65% water vapor and from about 35% to about 63% nitrogen. Since ZNH itself contains no carbon, no toxic carbon monoxide is produced as a combustion by-product.

The gas generation capabilities of the propellants and propellant compositions of the present invention, including ZNH, can be readily appreciated by reference to Table 1 below.

TABLE 1

| PROPELLANT COMPOSITION | GAS YIELD* |
|---|---|
| ZNH Based Propellant: | 2.65 |
| 68 wt % ZNH | |
| 15 wt % $Al_2O_3 \cdot 3H_2O$ | |
| 11 wt % schuller 753 Fiberglass | |
| 6 wt % $NaNO_3$ | |
| Sodium Azide Based Propellants: | |
| (1) | 1.36 |
| 58 wt % $NaN_3$ | |
| 31 wt % $Fe_2O_3$ | |
| 11 Wt % other Modifiers | |
| (2) | 1.54 |
| 65 wt % $NaN_3$ | |
| 35 wt % CuO | |

*Gas Yields are expressed in gram-moles of gas for 100 grams of propellant composition.

Table 1 lists the produced gas volume to weight ratio of one embodiment of the propellant compositions of the present invention in comparison with the produced gas volume to weight ratio of known, commercially available propellant compositions. As shown in Table 1, the propellant compositions of the present invention can produce in excess of about 1.6 gram-moles of gas for each 100 grams of propellant composition combusted. Preferably, however, the pyrotechnic propellant compositions of the present invention can produce in excess of about 2 gram-moles of gas for each 100 grams of propellant composition combusted, and more preferably, can produce in excess of about 2.2 gram-moles of gas for each 100 grams of propellant composition combusted. Also shown in Table 1, the high gas production of the propellants of the present invention can be as much as two times that generated by a similar quantity of known propellants, such as sodium azide/iron oxide propellant compositions.

As a result of the high gas production to propellant weight ratio of the propellant compositions of the present invention, less propellant material is needed to produce an amount of gas sufficient to inflate an air/safety bag. In addition, less particulate matter is created upon combustion to be borne by the gas produced. Moreover, less residue to be disposed of remains after the composition has been combusted.

The following examples further assist in illustrating pertinent features of the pyrotechnic propellants and propellant compositions of the present invention. Unless otherwise noted, as used in the following examples, all references to "wt %" refer to weight percentage.

EXAMPLE 1

Zinc nitrate hydrazine (ZNH) was obtained by slowly dripping hydrazine hydrate into a concentrated solution of zinc nitrate (180 grams/100 ml) held at approximately 15° C. The insoluble ZNH precipitated out of the zinc nitrate. The precipitate was collected by filtering using a filter having a pore size of about 20 microns and subsequently washed with water to remove impurities and residual zinc nitrate.

The ZNH obtained was combined with an oxidizer and a slag forming compound into a propellant composition comprising about 35.2 wt % ZNH, about 30.3 wt % sodium azide, about 7.2 wt % sodium nitrate, about 5 wt % iron oxide, about 5 wt % glass (SCHULLER 753) fiber, about 5 wt % magnesium hydroxide and about 0.3 wt % hydroxypropyl cellulose. The propellant composition was pressed at about 35 ksi (241 MPa) into flat wafers having a size of about 12 mm and an average density of about 2.0769 g/cc. A 10 g test sample was placed into a heavywall bomb chamber and fired into a tank. Upon ignition of the propellant composition sample by electrical squib, the combusted propellant composition produced the equivalent of approximately 2.1 gram-moles of gas for 100 g of propellant composition. After weighing the retained residue, it was determined that approximately 96% of the theoretical weight retention was obtained indicating enhanced particle retention.

EXAMPLE 2

Using the same process followed in Example 1, a propellant composition comprising about 68 wt % ZNH, about 15 wt % $Al_2O_3 \cdot 3H_2O$, about 11 wt % Schuller 753 fiberglass, and about 6 wt % sodium nitrate, was pressed at about 35 ksi (241 MPa) into flat wafers having a size of about 12 mm and an average density of about 2.0439 g/cc and tested as in Example 1. Upon ignition and combustion of the 10 g propellant composition sample by electrical squib, the equivalent of approximately 2.7 gram-moles of gas for 100 g of propellant composition were obtained. After weighing the retained residue, it was determined that approximately 95% of the theoretical weight was retained indicating enhanced particle retention.

The propellants and propellant compositions of the present invention can be used in both hybrid and pure pyrotechnic inflators. In terms of inflator assembly design, the advantages of using the propellants and propellant compositions of the present invention are numerous. Because a smaller amount of propellant is needed to produce a sufficient amount of gas to inflate the air/safety bag, the inflator assembly can be manufactured smaller, lighter, and with less expense than those currently in use. In addition, because a smaller amount of particulate matter is produced during combustion, there are reduced filtering requirements for the gas produced, which simplifies inflator design and reduces production costs.

As noted, the above-identified types of propellants are used in automotive inflatable safety systems, more specifically in the gas generator which provides gases at an elevated temperature to the air/safety bag for its expansion at the appropriate time. One embodiment of a gas generator which may use the above-noted propellants is illustrated in FIGS. 1–2. The gas generator 10 generally includes an inflator housing 14 having a plurality of gas generator outlets 18 extending therethrough for providing gases to expand the air/safety bag (not shown) fluidly interconnected therewith. An ignition assembly 22 substantially coincides with the central, longitudinal axis of the housing 14 and includes an initiator 26 which is interconnected with an appropriate sensor (not shown), an ITLX ignition cord 30, and an ignition material 34, all of which are substantially contained within an ignition tube 38 having a plurality of holes extending therethrough. A plurality of propellant grains or wafers 42 for producing the desired propellant gases are positioned about the ignition assembly 22, more particularly the ignition tube 38, and a filter 46 is positioned between the propellant grains 42 and gas generator outlets 18 for filtering combustion residue. A plenum 50 is positioned adjacent the filter 46 and a burst seal (not shown) is positioned between the plenum 50 and the interior surface of the housing 14.

Each of the propellant grains 42 is generally in accordance with the compositions identified herein which as noted have both desired burn rate and residue retention characteristics. Due to the enhanced burn rate associated with the propellant grains 42, they are substantially disk-shaped and only have a single passageway 54 extending therethrough to receive the ignition tube 38 (e.g., a plurality of holes in the propellant grain 42 to provide increased surface area is not required). In one embodiment, the propellant grains have an outside diameter of about 40 mm, an inside diameter (i.e., the diameter of the passageway of about 10 mm, and a density of about 2.2 g/cc. Moreover, there is a space 58 between adjacent propellant grains 42 to allow propellant gases to flow out through the gas generator outlets 18. As a result, the thickness of the propellant grains adjacent the central passageway 54 is about 5 mm and the thickness of the more perimeter portions of the grains is about 6 mm.

The interaction of the inflator assembly elements and the propellant composition can be more easily understood in the following description of one method of the present invention in conjunction with references to FIGS. 1–2. The triggering of the ignition assembly 22 by an electrical pulse from an appropriate detector (not shown) ignites the ignition material 34 which in turn ignites the propellant grains 42, thereby producing gases as the propellant combusts. Simultaneous with gas production, the heat created by the exothermic combustion reaction can cause a slag forming compound in the propellant composition to quickly liquefy and subsequently solidify into a residue, trapping most of the particulate matter created from combustion. The produced gases pass through the filter 46 and are expelled from the outlets 18 in the gas generator housing 14 before entering and inflating an air/safety bag (not shown).

While a basic inflator assembly is shown, variations in inflator assembly design are contemplated by the present invention. For example, depending upon the residue retention of the propellant composition used, the filtering mechanism (i.e., a composite structure of ceramic, fiberglass, felt, steel-wool, screen, etc.) for filtering particulate matter from the generated gas can be simplified or even eliminated. In addition, while an electrical ignition system is shown in FIG. 1 for igniting the pyrotechnic propellant compositions, other apparatus and methods, such as those which create compressive or shear forces can be used for initiating the pyrotechnic train leading to the ignition of the pyrotechnic propellant compositions of the present invention.

The foregoing description of the present invention has been presented for purposes of illustration and description. However, the description is not intended to limit the invention to the form disclosed herein. For instance, although the propellants associated with the present invention have been described in relation to hydrazine, it will be appreciated that the present invention can be characterized by the properties associated with the described propellants. Consequently, variations and modifications, commensurate with the above teachings and the skill and/or knowledge of the relevant art, are within the scope of the present invention. The embodiments described hereinabove are further intended to explain best modes known of practicing the invention and to enable others skilled in the art to utilize the invention in such or other embodiments and with the various modifications required by their particular applications or uses of the invention. It is intended that the appended claims be construed to include alternative embodiments to the extent permitted by the prior art.

What is claimed is:

1. An inflator assembly for an inflatable safety system comprising:

(a) a gas generator housing having at least one gas outlet;

(b) a pyrotechnic propellant composition disposed inside said gas generator housing, said propellant composition comprising a compound containing hydrazine, wherein said compound containing hydrazine comprises a metal complex of hydrazine; and (c) a propellant ignition assembly.

2. The inflator as claimed in claim 1, wherein said metal complex of hydrazine comprises a metal selected from the group consisting of transition metals.

3. The inflator as claimed in claim 1, wherein said metal complex of hydrazine comprises zinc nitrate hydrazine ($[Zn(N_2H_4)_3](NO_3)_2$).

4. The inflator as claimed in claim 1, wherein said compound containing hydrazine comprises zinc nitrate hydrazine, said propellant composition comprising at least about 40 wt % zinc nitrate hydrazine, from about 5 wt % to about 25 wt % of an oxidizer, and from about 5 wt % to about 25 wt % of a slag forming compound.

5. An inflator assembly for an inflatable safety system comprising:

(a) a gas generator housing having at least one gas outlet;

(b) a pyrotechnic propellant composition disposed inside said gas generator housing, said propellant composition having a burn rate of at least about 1 inch/second (2.54 cm/sec) at 1000 psi (6.9 MPa), a combustion temperature of less than about 3000° F. (1649° C.), and capable of producing at least about 2 gram-moles of gas from about 100 grams of said propellant composition; and (c) a propellant ignition assembly.

6. The inflator as claimed in claim 5, wherein said propellant composition comprises a metal complex of hydrazine.

7. The inflator as claimed in claim 5, wherein said propellant composition comprises a metal complex of hydrazine, an inorganic oxidizer and a slag-forming compound.

8. The inflator as claimed in claim 5, wherein said propellant composition comprises a metal complex of hydrazine, an inorganic oxidizer and fibers.

9. The inflator as claimed in claim 6, wherein said metal complex of hydrazine comprises zinc nitrate hydrazine.

10. The inflator as claimed in claim 7, wherein said inorganic oxidizer comprises an inorganic oxidizer selected from the group consisting of alkaline earth metal nitrates.

11. The inflator as claimed in claim 7, wherein said inorganic oxidizer comprises an inorganic oxidizer selected from the group consisting of alkaline earth metal nitrites.

12. The inflator as claimed in claim 7, wherein said inorganic oxidizer comprises an inorganic oxidizer selected from the group consisting of alkali metal nitrates.

13. The inflator as claimed in claim 7, wherein said inorganic oxidizer comprises an inorganic oxidizer selected from the group consisting of alkali metal nitrites.

14. The inflator as claimed in claim 7, wherein said inorganic oxidizer comprises an inorganic oxidizer selected from the group consisting of transition metal oxides.

15. The inflator as claimed in claim 7, wherein said slag forming compound comprises a slag forming compound selected from the group consisting of silicates.

16. The inflator as claimed in claim 7, wherein said slag forming compound comprises a slag forming compound selected from the group consisting of aluminates.

17. The inflator as claimed in claim 8, wherein said fibers comprise graphite fibers.

18. The inflator as claimed in claim 8, wherein said fibers comprise glass fibers.

19. An inflator assembly for an inflatable safety system comprising:

(a) a gas generator housing having at least one gas outlet;

(b) a pyrotechnic propellant composition comprising a metal complex of hydrazine, an inorganic oxidizer and a slag-forming compound disposed inside said gas generator housing, said propellant composition having a burn rate of at least about 1 inch/second (2.54 cm/sec) at 1000 psi (6.9 MPa) and capable of producing at least about 2 gram-moles of gas from about 100 grams of said propellant composition; and (c) a propellant ignition assembly.

20. The inflator as claimed in claim 19, wherein said inorganic oxidizer comprises an inorganic oxidizer selected from the group consisting of alkaline earth metal nitrates.

21. The inflator as claimed in claim 19, wherein said inorganic oxidizer comprises an inorganic oxidizer selected from the group consisting of alkaline earth metal nitrites.

22. The inflator as claimed in claim 19, wherein said inorganic oxidizer comprises an inorganic oxidizer selected from the group consisting of alkali metal nitrates.

23. The inflator as claimed in claim 19, wherein said inorganic oxidizer comprises an inorganic oxidizer selected from the group consisting of alkali metal nitrites.

24. The inflator as claimed in claim 19, wherein said inorganic oxidizer comprises an inorganic oxidizer selected from the group consisting of transition metal oxides.

25. The inflator as claimed in claim 19, wherein said slag forming compound comprises a slag forming compound selected from the group consisting of silicates.

26. The inflator as claimed in claim 19, wherein said slag forming compound comprises a slag forming compound selected from the group consisting of aluminates.

27. An inflator assembly for an inflatable safety system comprising:

(a) a gas generator housing having at least one gas outlet;

(b) a pyrotechnic propellant composition comprising a metal complex of hydrazine, an inorganic oxidizer and fibers disposed inside said gas generator housing, said propellant composition having a burn rate of at least about 1 inch/second (2.54 cm/sec) at 1000 psi (6.9 MPa) and capable of producing at least about 2 gram-moles of gas from about 100 grams of said propellant composition; and (c) a propellant ignition assembly.

28. The inflator as claimed in claim 27, wherein said fibers comprise graphite fibers.

29. The inflator as claimed in claim 27, wherein said fibers comprise glass fibers.

30. An inflator assembly for an inflatable safety system comprising:

(a) a gas generator housing having at least one gas outlet;

(b) a pyrotechnic propellant composition disposed inside said gas generator housing, said propellant composition comprising a compound containing hydrazine, wherein said compound containing hydrazine comprises zinc nitrate hydrazine, said propellant composition comprising at least about 40 wt % zinc nitrate hydrazine, from about 5 wt % to about 25 wt % of an oxidizer, and from about 5 wt % to about 25 wt % of a slag forming compound; and (c) a propellant ignition assembly.

31. An inflator assembly for an inflatable safety system comprising:

(a) a gas generator housing having at least one gas outlet;

(b) a pyrotechnic propellant composition disposed inside said gas generator housing, said propellant composition having a burn rate of at least about 1 inch/second (2.54 cm/sec) at 1000 psi (6.9 MPa) and capable of producing at least about 2 gram-moles of gas from about 100 grams of said propellant composition, wherein said propellant composition comprises a fuel selected from the group consisting of complexes of hydrazine, wherein said complex of hydrazine comprises zinc nitrate hydrazine; and (c) a propellant ignition assembly.

* * * * *